United States Patent
Lee et al.

(10) Patent No.: US 9,825,528 B2
(45) Date of Patent: Nov. 21, 2017

(54) COMPENSATING FOR VOLTAGE CHANGES IN DRIVER CIRCUITS

(71) Applicant: Allegro Microsystems, LLC, Worcester, MA (US)

(72) Inventors: Nai-Chi Lee, Nashua, NH (US); Pranav Raval, Nashua, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 199 days.

(21) Appl. No.: 14/979,886

(22) Filed: Dec. 28, 2015

(65) Prior Publication Data

US 2017/0187280 A1 Jun. 29, 2017

(51) Int. Cl.
*H02M 3/156* (2006.01)
*H05B 33/08* (2006.01)
*H02J 1/00* (2006.01)
*G06F 1/26* (2006.01)

(52) U.S. Cl.
CPC .............. *H02M 3/156* (2013.01); *G06F 1/26* (2013.01); *H02J 1/00* (2013.01); *H05B 33/0815* (2013.01)

(58) Field of Classification Search
None
See application file for complete search history.

(56) References Cited

U.S. PATENT DOCUMENTS

| | | | |
|---|---|---|---|
| 6,621,235 B2 * | 9/2003 | Chang ................ | H05B 33/0827 315/194 |
| 6,982,527 B2 | 1/2006 | Lee et al. | |
| 7,675,245 B2 * | 3/2010 | Szczeszynski ............ | G05F 1/46 315/185 S |
| 7,999,487 B2 | 8/2011 | Szczeszynski | |
| 8,111,006 B2 * | 2/2012 | Komiya .................... | G09G 3/14 315/291 |
| 8,169,161 B2 | 5/2012 | Szczeszynski et al. | |
| 8,193,725 B2 * | 6/2012 | Chen .................. | H05B 33/0815 315/185 S |
| 8,339,049 B2 | 12/2012 | Kang et al. | |
| 8,379,012 B2 * | 2/2013 | Saether ................. | G06F 1/3218 345/100 |
| 8,456,105 B2 | 6/2013 | Wang et al. | |
| 8,482,225 B2 * | 7/2013 | Szczeszynski ..... | H05B 33/0851 315/185 R |
| 8,519,630 B2 * | 8/2013 | Wang ................. | H05B 33/0818 315/185 R |
| 8,664,930 B2 | 3/2014 | Kang et al. | |
| 8,742,682 B1 | 6/2014 | Wang et al. | |
| 8,901,835 B2 | 12/2014 | Kang et al. | |
| 8,937,433 B1 | 1/2015 | Wang et al. | |
| 8,957,607 B2 * | 2/2015 | Raval ............................ | 315/224 |

(Continued)

*Primary Examiner* — Crystal L Hammond
(74) *Attorney, Agent, or Firm* — Daly, Crowley, Mofford & Durkee, LLP

(57) ABSTRACT

In one aspect, an integrated circuit (IC) is configured to receive an input signal and includes a boost duty cycle control circuit configured to provide duty cycle control to a power conversion stage configured to drive a load. The power conversion stage is configured to receive an input voltage. The IC also includes a current control circuit configured to control current of a first current source coupled to the first load and an inverter configured to provide an output signal comprising a negative of the input voltage, the output of the inverter configured to be coupled to the boost duty cycle control circuit.

14 Claims, 3 Drawing Sheets

(56) References Cited

U.S. PATENT DOCUMENTS

| | | | | |
|---|---|---|---|---|
| 8,994,279 B2* | 3/2015 | Raval | ............... | H02M 3/156 |
| | | | | 315/186 |
| 9,144,126 B2* | 9/2015 | Raval | ............... | H05B 33/0818 |
| 9,237,613 B1* | 1/2016 | Xiong | ............... | H05B 33/0815 |
| 9,615,413 B2* | 4/2017 | Raval | ............... | H05B 33/0815 |
| 9,642,203 B2* | 5/2017 | Lee | ............... | H05B 33/0815 |
| 2007/0120506 A1* | 5/2007 | Grant | ............... | H05B 33/0851 |
| | | | | 315/312 |
| 2008/0094861 A1* | 4/2008 | Wang | ............... | H02M 3/156 |
| | | | | 363/21.11 |
| 2012/0081934 A1* | 4/2012 | Garrity | ............... | H02M 7/46 |
| | | | | 363/37 |
| 2013/0009556 A1* | 1/2013 | Szczeszynski | ............... | H03K 7/08 |
| | | | | 315/185 R |
| 2013/0009557 A1* | 1/2013 | Szczeszynski | ............... | H05B 33/0827 |
| | | | | 315/186 |
| 2014/0117964 A1* | 5/2014 | Walters | ............... | H05B 33/0815 |
| | | | | 323/299 |
| 2014/0265844 A1* | 9/2014 | Sadwick | ............... | H05B 33/0815 |
| | | | | 315/85 |
| 2014/0292220 A1* | 10/2014 | Trattler | ............... | H02M 3/157 |
| | | | | 315/287 |
| 2015/0061528 A1* | 3/2015 | Raval | ............... | H05B 33/0827 |
| | | | | 315/210 |
| 2015/0216009 A1* | 7/2015 | Lee | ............... | H05B 33/0845 |
| | | | | 315/307 |
| 2016/0006336 A1* | 1/2016 | Bennett | ............... | H02M 1/00 |
| | | | | 323/271 |

* cited by examiner

COMPENSATING FOR VOLTAGE CHANGES IN DRIVER CIRCUITS

BACKGROUND

Light emitting diode (LED) driver circuits are often called upon to drive a number of series connected strings of diodes simultaneously. The strings of diodes (or "LED channels") may be operated in parallel, with a common voltage node supplying all of the strings. A DC-DC converter (e.g., a boost converter, a buck converter and so forth) may be employed by the LED driver circuit to maintain a regulated voltage level on the various LED channels during operation so that all LED channels have adequate operational power. Feedback from the LED channels may be used to control the DC-DC converter. To reduce unnecessary power consumption, it is desirable to keep the regulated voltage level on the voltage node to a minimum or near minimum, while still providing adequate power to all channels. One commonly used technique to adjust the brightness from LED string is to rapidly turn on/off the LED current using a PWM (pulsed width modulation) dimming signal. The average luminous output is thus proportional to the duty cycle of the PWM dimming signal.

SUMMARY

In one aspect, an integrated circuit (IC) is configured to receive an input signal and includes a boost duty cycle control circuit configured to provide duty cycle control to a power conversion stage configured to drive a load. The power conversion stage is configured to receive an input voltage. The IC also includes a current control circuit configured to control current of a first current source coupled to the first load and an inverter configured to provide an output signal comprising a negative of the input voltage, the output of the inverter configured to be coupled to the boost duty cycle control circuit.

In another aspect, a method includes receiving an input voltage. The input voltage is supplied to a power conversion stage configured to drive a load. The method also includes providing a compensation signal comprising a negative of the input voltage to a boost duty cycle control circuit configured to provide duty cycle control to the power conversion stage.

One or more of the aspects above may include one or more of the following features. The load may be one or more light emitting diodes (LEDs). The load may be a central processing unit (CPU). The load may be a first load; the IC may further include a second load in parallel with the first load, a second current source coupled to the second load and an amplifier having inputs configured to be connected to each of the first and second loads and an output coupled to the boost duty cycle control circuit, the power conversion stage may be further configured to drive the second load; and the current control circuit may be further configured to control current of the second current source. The first load may be a first string of light emitting diodes (LEDs) and the second load may be a second string of LEDs. The output of the inverter may be configured to be coupled in series with a first capacitor and a compensation node and the compensation node may be configured to couple to a second capacitor, the boost duty control circuit and the output of the comparator. The IC may further include a first capacitor in series with a compensation node and the output of the inverter and a second capacitor coupled to the compensation node; and the compensation node may be coupled to the boost duty control circuit and the output of the comparator. The output of the inverter may be equal to:

$$-a*(Vin-b),$$

where a and b are constants and Vin is the input voltage. The current control circuit may be configured to receive a pulse width modulation (PWM) signal.

DESCRIPTION OF THE DRAWINGS

The foregoing features of the invention, as well as the invention itself may be more fully understood from the following detailed description of the drawings, in which.

DETAIL DESCRIPTION

There are several unique challenges that arise with power converter for LED (light emitting diode) drivers. For instance, in order to reduce power loss, the output voltage is maintained at just above the LED string voltage, which means any slight dip in Vout will cause LED current to drop significantly. If the dip lasts longer than a few milliseconds, the change in LED brightness can be observed by human eyes as 'blinking." In another instance, in order to reduce or modulate the brightness of LED string, the LED current is turned on/off using a PWM (Pulse Width Modulation) dimming signal. For example, a 200 Hz PWM signal at 25% duty cycle dims down the LEDs to a 25% brightness. When operating at a lower PWM duty cycle, a COMP (compensation) voltage will take longer time to adjust. For example, at 2% duty cycle, COMP will take approximately 50 times longer to adjust compared to a 100% duty cycle. This causes the LED string to blink noticeably during a prolonged voltage dip.

Figure 1:
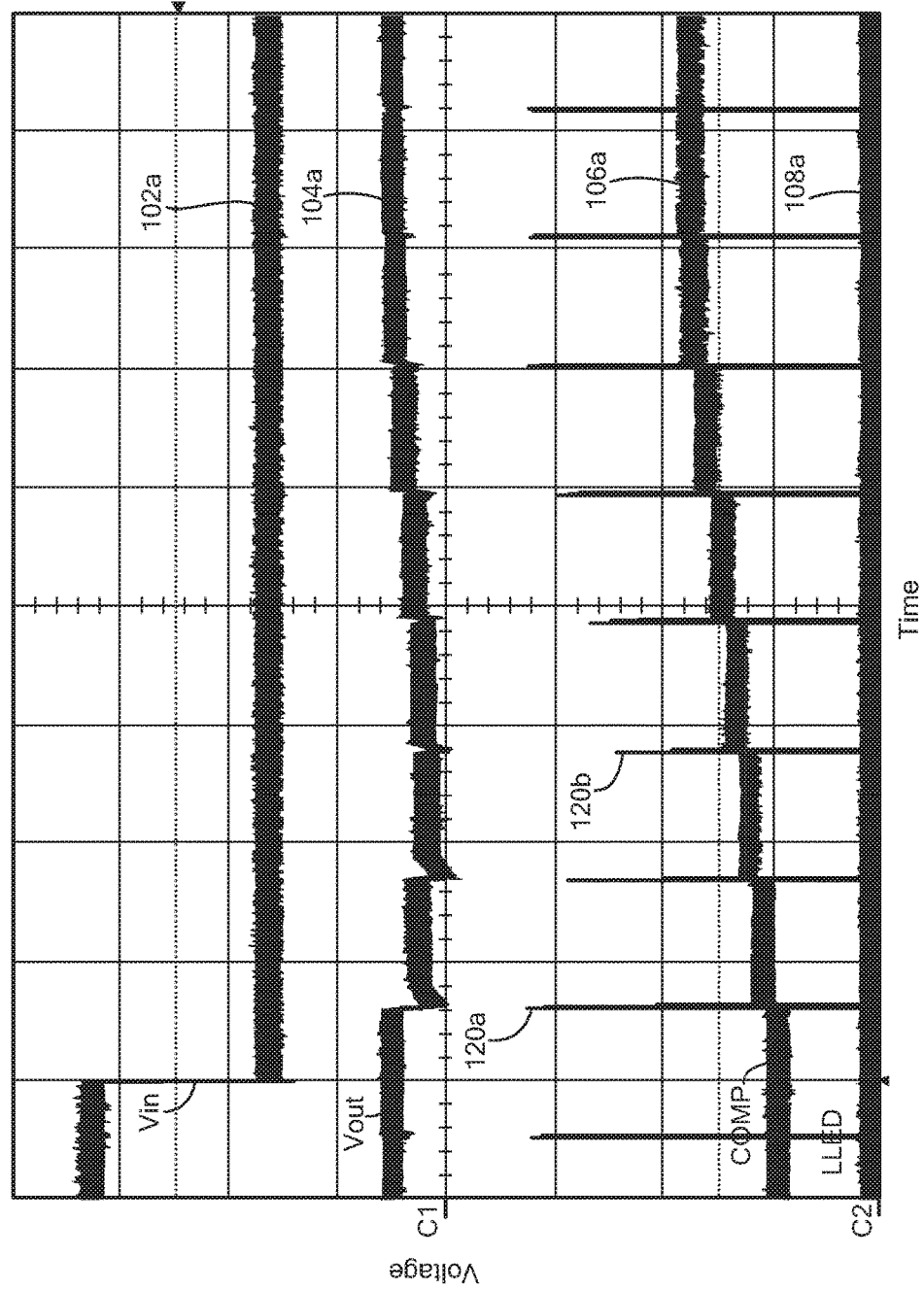
FIG. 1 is a graph depicting waveforms without using the circuit of FIG. 2.

Referring to FIG. 1, when a voltage in (Vin) signal 102a drops (e.g., from 16 volts to 8 volts) a voltage out (Vout) 104a dips because the compensation voltage (COMP) 106a is unable to react fast enough. Thus, the LED current 108a also dips. For instance, the LED current peak 120a drops to a current peak 120b and provides a noticeable blinking.

Described herein are techniques to compensate for sudden input voltage increases and decreases. For example, with respect to voltage drops in LED driver system, there is no noticeable LED blinking. While an LED driver is described herein, one of ordinary skill in the art would recognize upon reading the specification that the techniques are applicable to power converters in general. The techniques described herein may be used in many types of embodiments. In one embodiment, gas/electric cars may cause rapid increases or decreases in voltage. For example, if the car switches from electric to gas power Vin may increase from 8V to 16V and if the car switches from gas to electric power Vin may drop from 16 v to 8V. In another embodiment, the driver may be used to drive a central processing unit (CPU).

Figure 2:
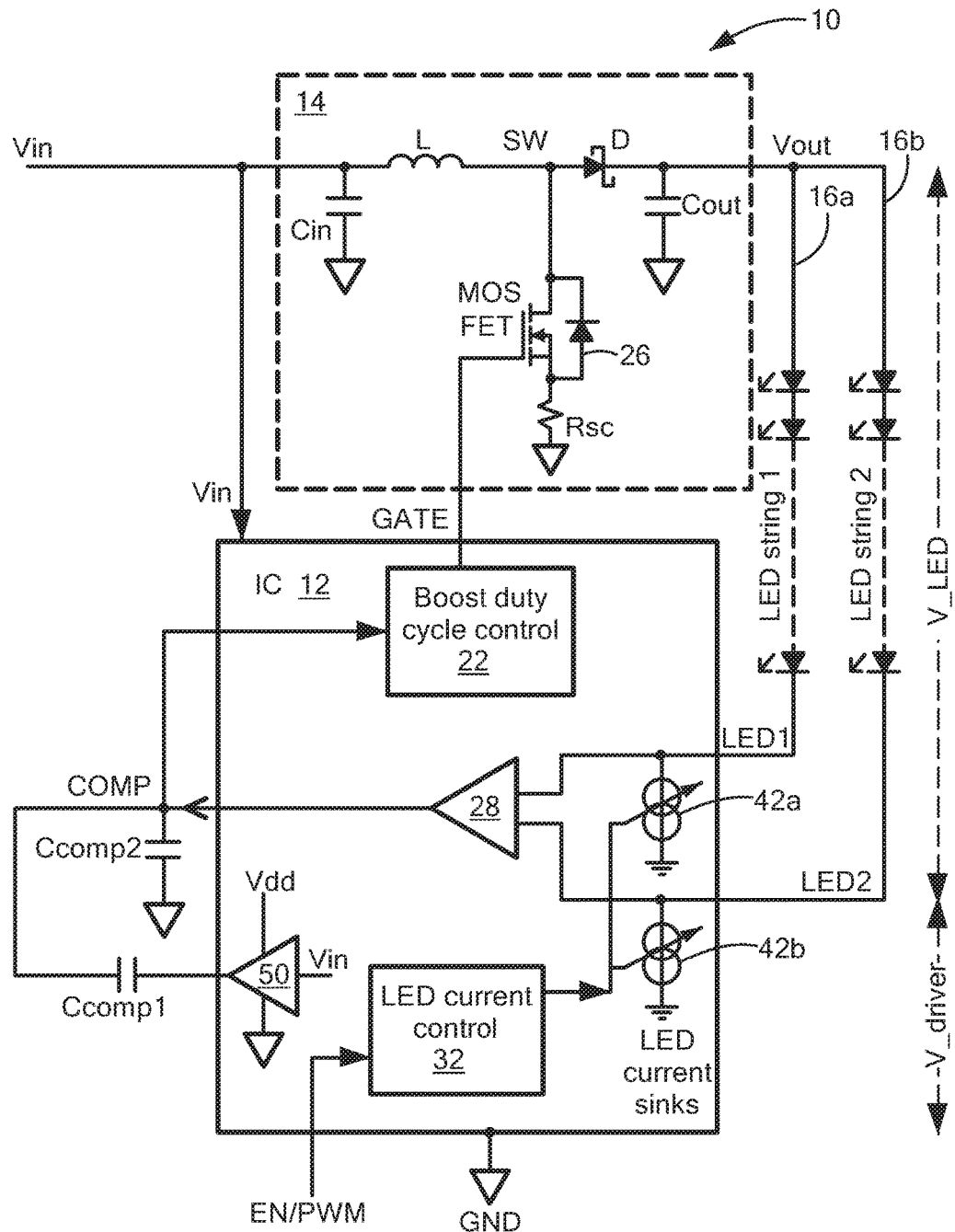
FIG. 2 is a schematic diagram of an example of a light emitting diode (LED) driver system configured to compensate for voltage changes.

FIG. 2 is a schematic diagram illustrating an example of a light emitting diode (LED) driver system 10 that includes an integrated circuit (IC) 12, strings of LEDs 16a, 16b and a boost converter 14. The boost converter 14 includes an input capacitance, Cin; an inductor, L; a diode, D and an output capacitance Cout. The boost converter 14 in this example includes a switch 26 (e.g., a MOSFET switch). In other examples, the switch 26 may be part of the IC 12. A node SW couples the inductor L, the diode D and the switch 26.

The IC 12 includes a boost switch driver 22, an LED current control 32 and LED current sources 42a, 42b. The IC 12 also includes an error amplifier 28 with inputs coupled to the LED strings 16a, 16b and an output coupled to a compensation node, COMP. The output signal from the amplifier 28 is a feedback signal from the LED strings 16a, 16b and provides a portion of a compensation signal to the boost duty cycle control 22. The LED current control 32 receives an enable signal or PWM signal The IC 12 is used to drive the strings of LEDs 16a, 16b and to provide a dimming function to the LEDs. In particular, the boost control driver 22 provides a switching operation to regulate the output voltage VOUT. If either LED1 or LED2 pin is below a regulation target voltage during PMW on-time, the amplifier 28 will charge up COMP to increase the boost duty cycle, which subsequently increases VOUT. The LED current control 32 controls the LED current sinks 42a, 42b. In one example, the LED current control 32 may provide a dimming operation. In one example, switching is performed at a high frequency of 100 kHz to 2 MHz and the dimming operation is performed at low frequency of 100 Hz to 2 kHz.

The IC further includes an inverter 50 that receives an input from Vin. The output of the inverter 50 is connected to a capacitor Ccomp1 which is coupled to the COMP node. The output of the inverter 50 comprises a portion of the compensation signal to the boost duty cycle control circuit 22.

A capacitor Ccomp2 is coupled to the COMP node and ground. In this configuration, the inverter 50 contributes to the compensation signal by providing a signal that accounts for any rise or drop in Vin. In one example, the output of the inverter 50 is equal to:

$$-a*(Vin-b).$$

where a and b are constants. In one particular example, a=0.3 and b=20 volts, Ccomp1 is 82 nF and Ccomp2 is 330 nF. In some examples, the ratio between Ccomp1 and Ccomp2 can be adjusted, depending on the step-change requirement at COMP, to achieve optimal transient response. In some examples Ccomp1 and Ccomp2 may be on the IC 12 rather than being external to IC 12 as shown in FIG. 2. In other examples, series resistors can be added to Ccomp1 and Ccomp2, in order to further fine-tune the transient response.

In operation, when Vin drops, the inverter 50 generates a positive impulse signal to the COMP node, which causes an immediate increase to the boost duty cycle control 14 to increase the inductor current, before any drop in LED regulation voltage is detected by amplifier 28. Likewise, when Vin increases, the inverter 50 generates a negative impulse signal to the COMP mode, which causes an immediate decrease to the boost duty cycle 14 control to reduce the inductor current, before any increase in LED regulation voltage is detected. As would be recognized to one of ordinary skill in the art, the feedback signal from the amplifier 28 contributes to the signal received by the COMP node, but during dramatic increases and decreases in Vin the predominate signal at the COMP node would be from the inverter 50.

While the illustrated arrangement includes multiple LEDs connected in series in a string 16a, 16b, in other configurations, the driver system 10 may drive a single LED, any multiple parallel-connected LEDs, multiple strings of LEDs connected in parallel, a single LED string or some combination of the above.

The boost converter 14 is a DC-DC voltage converter that is used to convert a direct current (DC) input voltage Vin to a DC output voltage Vout for use in driving the LED strings 16a, 16b. As is well known, a boost converter 14 is a form of switching regulator that utilizes switching techniques and energy storage elements to generate a desired output voltage. Other types of DC-DC converters may alternatively be used.

In the arrangement shown in FIG. 2, the IC 12 is implemented as an integrated circuit (IC) and the boost converter 14 is implemented outside the IC using discrete components. It should be appreciated, however, that many alternative arrangements are possible including fully integrated implementations, fully discrete implementations, or some other combination of integrated and discrete components.

As shown in FIG. 2, the IC 12 may include boost control circuitry 22 for use in controlling the operation of boost converter 14. In general, the boost converter 14 and the boost controller 22 will operate together to regulate a voltage associated with the strings of LEDs 16a, 16b.

As described above, the boost converter 14 is operative for converting a DC input voltage Vin to a DC output voltage Vout that is adequate to supply the string of LEDs 16a, 16b. The operating principles of boost converters and other types of DC-DC converters are well known in the art. During operation, the boost control circuitry 22 provides a switching signal to a switching node (SW) of the boost converter 14. The switching signal draws current from the switching node (SW) at a controlled duty cycle to regulate a voltage associated with the LED strings 16a, 16b in a closed loop manner. It should be understood that the duty cycle used to control the boost converter 14 is a different parameter from the LED current control 32 used to adjust the illumination intensity of the LED strings 16a, 16b. In the illustrated embodiment, the boost converter 14 includes an inductor L, a diode D, input capacitance Cin and output capacitance Cout coupled together in a specific configuration. Other converter architectures (such as, for example, Buck, Buck-Boost, SEPIC, Flyback and so forth) may alternatively be used.

Figure 3:
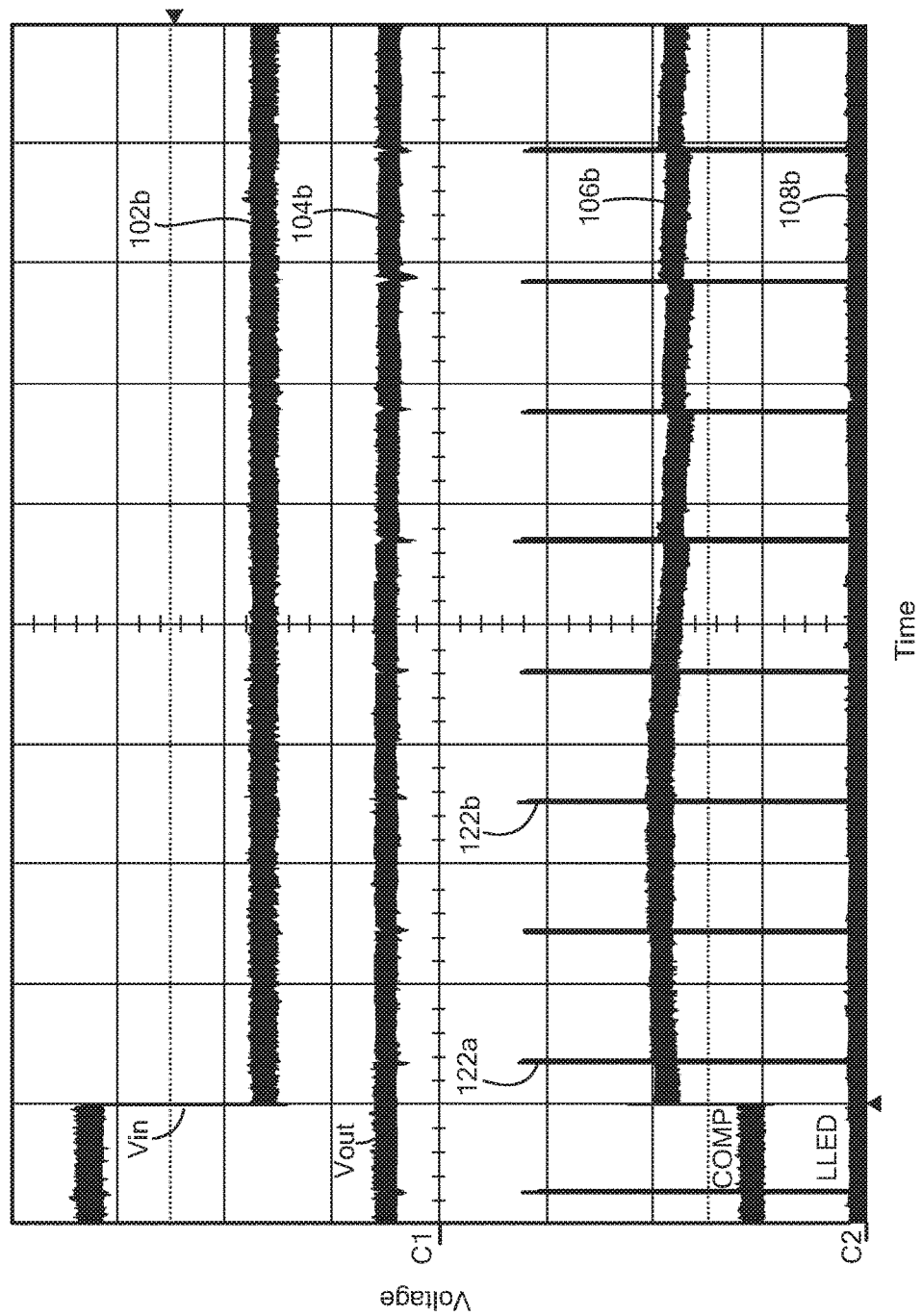
FIG. 3 is a graph depicting waveforms using the circuit of FIG. 2.

FIG. 3 depicts an example of voltage signals using the circuit 10. In one example, when a voltage in (Vin) signal 102b drops (e.g., from 16 volts to 8 volts) a voltage out (Vout) 104b remains nearly constant in voltage because the compensation signal (COMP) 106a is able to react fast enough. Thus, the LED voltage 108a does not dip either. For instance, the LED current peak 122a is the same as a voltage peak 122b. Therefore, there is no blinking of the LEDs.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. An integrated circuit (IC) configured to receive an input signal comprising:
    a boost duty cycle control circuit configured to provide duty cycle control to a power conversion stage configured to drive a load, the power conversion stage configured to receive an input voltage;
    a current control circuit configured to control current of a first current source coupled to the first load; and an inverter configured to provide an output signal comprising a negative of the input voltage, the output of the inverter configured to be coupled to the boost duty cycle control circuit.

2. The IC of claim 1, wherein the load is one or more light emitting diodes (LEDs).

3. The IC of claim 1, wherein the load is a central processing unit (CPU).

4. The IC of claim 1, wherein the load is a first load and further comprising:
   a second load in parallel with the first load;
   a second current source coupled to the second load; and
   an amplifier having inputs configured to be connected to each of the first and second loads and an output coupled to the boost duty cycle control circuit,
   wherein the power conversion stage is further configured to drive the second load, and
   wherein the current control circuit is further configured to control current of the second current source.

5. The IC of claim 4, wherein the first load is a first string of light emitting diodes (LEDs) and the second load is a second string of LEDs.

6. The IC of claim 4, wherein the output of the inverter is configured to be coupled in series with a first capacitor and a compensation node,
   wherein the compensation node is configured to couple to a second capacitor, the boost duty control circuit and the output of the comparator.

7. The IC of claim 4, further comprising:
   a first capacitor in series with a compensation node and the output of the inverter; and
   a second capacitor coupled to the compensation node,
   wherein the compensation node is also coupled to the boost duty control circuit and the output of the comparator.

8. The IC of claim 1, wherein the output of the inverter is equal to:

$$-a*(V\text{in}-b),$$

where a and b are constants and Vin is the input voltage.

9. The IC of claim 1, wherein the current control circuit is configured to receive a pulse width modulation (PWM) signal.

10. A method comprising:
    receiving an input voltage, the input voltage being supplied to a power conversion stage configured to drive a load; and
    providing a compensation signal comprising a negative of the input voltage to a boost duty cycle control circuit configured to provide duty cycle control to the power conversion stage.

11. The method of claim 10, wherein the power conversion stage drives a second load in parallel with the first load.

12. The method of claim 11, wherein the first load is a first string of light emitting diodes (LEDs) and the second load is a second string of LEDs.

13. The method of claim 12, wherein providing the compensation signal comprising a negative of the input voltage comprises providing a compensation signal comprising a signal equal to:

$$-a*(V\text{in}-b),$$

where a and b are constants and Vin is the input voltage.

14. The method of claim 13, wherein providing the compensation signal comprises providing a compensation signal further comprising a feedback signal from the first load.

* * * * *

UNITED STATES PATENT AND TRADEMARK OFFICE
CERTIFICATE OF CORRECTION

PATENT NO. : 9,825,528 B2  
APPLICATION NO. : 14/979886  
DATED : November 21, 2017  
INVENTOR(S) : Nai-Chi Lee et al.

Page 1 of 1

It is certified that error appears in the above-identified patent and that said Letters Patent is hereby corrected as shown below:

In the Specification

Column 2, Line 31, delete "'blinking." and replace with --"blinking."--

Column 2, Line 60, delete "from 16 v" and replace with --from 16V--

Column 3, Line 13, delete "PWM signal" and replace with --PWM signal.--

Column 3, Line 18, delete "during PMW" and replace with --during PWM--

Signed and Sealed this
Fifteenth Day of May, 2018

Andrei Iancu
*Director of the United States Patent and Trademark Office*